United States Patent [19]

Frerichs et al.

[11] Patent Number: 4,782,87

[45] Date of Patent: Nov. 8, 198

[54] VEHICLE WHEEL FOR PNEUMATIC TIRE

[75] Inventors: Udo Frerichs, Langenhagen; Heinz-Dieter Rach, Garbsen, both of Fed. Rep. of Germany

[73] Assignee: Continental Aktiengesellschaft, Hanover, Fed. Rep. of Germany

[21] Appl. No.: 900,829

[22] Filed: Aug. 27, 1986

[30] Foreign Application Priority Data

Aug. 31, 1985 [DE] Fed. Rep. of Germany ....... 3531177

[51] Int. Cl.$^4$ .............................................. B60B 21/10
[52] U.S. Cl. ................... 152/379.5; 152/380; 152/381.6; 152/DIG. 20; 152/520
[58] Field of Search ............... 152/379.3, 379.4, 379.5, 152/380, 381.4, 381.6, DIG. 20, 516, 520

[56] References Cited

U.S. PATENT DOCUMENTS

| 3,930,527 | 1/1976 | French | 152/520 |
| 3,999,587 | 12/1976 | Mitchell | 152/381.5 X |
| 4,078,597 | 3/1978 | Noda | 152/379.4 |
| 4,149,579 | 4/1979 | Senger | 152/516 X |
| 4,391,317 | 7/1983 | Savage | 152/516 |
| 4,662,418 | 5/1987 | Janus | 152/380 |
| 4,694,873 | 9/1987 | Gerloff et al. | 152/DIG. 20 |

FOREIGN PATENT DOCUMENTS

| 0131117 | 1/1985 | European Pat. Off. | 152/379 |
| 2207272 | 8/1972 | Fed. Rep. of Germany | 301/PW |
| 3000428 | 7/1981 | Fed. Rep. of Germany | 152/5 |
| 3246131 | 6/1984 | Fed. Rep. of Germany | 152/DI 20 |
| 3512330 | 10/1986 | Fed. Rep. of Germany | 152/379 |

Primary Examiner—Robert B. Reeves
Assistant Examiner—Russell D. Stormer
Attorney, Agent, or Firm—Becker & Becker, Inc.

[57] ABSTRACT

A vehicle wheel having a rigid rim on which can 1 mounted a pneumatic tire. The rim has rim flanges th essentially extend radially inwardly. The wheel also h a drop base that is centrally disposed relative to the ri and is open radially outwardly. Disposed on the radial inner side of the rim, between the drop base and ea rim flange, are respective recessed mounting portio for receiving the beads of a tire. To enlarge the suppoi ing surfaces, an annular support member spans the dr base of the wheel, with the support member being in tl form of a cylindrical ring that is exactly cylindrical or at most slightly curved.

5 Claims, 2 Drawing Sheets

VEHICLE WHEEL FOR PNEUMATIC TIRE

BACKGROUND OF THE INVENTION

Field of the Invention

The present invention relates to a vehicle wheel having a rigid rim on which can be mounted a pneumatic tire. The rim has rim flanges that essentially extend radially inwardly. The wheel also has a drop base that is centrally disposed relative to the rim, and is open radially outwardly. Disposed on the radially inner side of the rim, between the drop base and each rim flange, are respective recessed mounting portions for receiving the beads of a tire.

Description of the Prior Art

A vehicle wheel of this general type is described, for example, in allowed patent application Ser. No. 896,384 Frericks et al filed Aug. 13, 1986, which belongs to the assignee of the present application. Among other things, this known vehicle wheel is particularly suitable for being able to operate with a flat tire, because when air is lost, the inner wall of the tire can be supported upon the support surfaces of the rim, and the tire can bulge laterally outwardly in an unobstructed manner without the tire folding or buckling. U.S. Pat. No. 4,408,647 Kuhn et al dated Oct. 11, 1983 and German Offenlegungsschrift No. 31 45 252 corresponding to U.S. Ser. No. 431,604-Seitz et al filed Sept. 30, 1982, abandoned and replaced by continuation application U.S. Ser. No. 720,054-Seitz et al filed Apr. 5, 1985 abandoned and replaced by co-pending U.S. Ser. No. 937,439-Seitz et al filed Dec. 3, 1986 now U.S. Pat. No. 4,732,198-Frerichs et al dated Mar. 22, 1988, all of which belong to the assignee of the present application, propose variations of the known vehicle wheel such that by omitting a radially outer drop base, the support surfaces of the rim are considerably enlarged. However, it has been proven that at a given wall thickness, wheels having a nearly cylindrical rim do not have the stability or rigidity of a wheel that has a drop base.

It is therefore an object of the present invention to provide a vehicle wheel of the aforementioned general type where an enlargement of the supporting surfaces is achieved while maintaining the rigidity characteristics of a wheel that has a drop base.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The vehicle wheel of the present invention is characterized primarily in that an annular support member spans the drop base of the wheel, with the support member being in the form of a cylindrical ring that is exactly cylindrical or is at most slightly curved. The vehicle wheel of the present invention provides not only an enlargement of the support surfaces, but also has the advantage of increasing the diameter of the support surfaces, thus resulting in greater operating efficiencies when a flat tire is encountered. With wide rims and tires, and a detachably mounted support member, there is obtained the advantage of being able to more easily mount the tire, because the radially outer drop base can be utilized in the customary manner for introducing the wheel into the interior of the tire. A further advantage of the inventive configuration is that the side walls of the drop base can simultaneously serve as abutments for cover rings that fill in or cover that part of a recessed mounting portion on the radially inner periphery of the rim that remains after a tire bead has been mounted therein.

Further specific features of the present invention will be discussed in detail subsequently.

DESCRIPTION OF PREFERRED EMBODIMENTS

Figure 1:
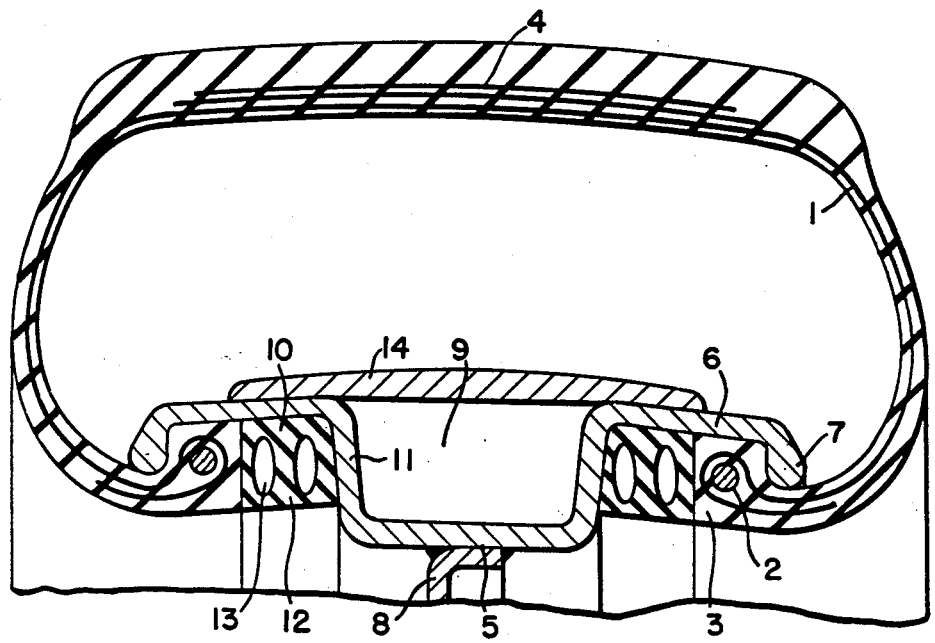
FIG. 1 is a view that shows a vehicle wheel and tire assembly, and in particular is a partial radial section through one inventive embodiment of a rim having a support member that spans the wheel drop base and rests upon the lateral support surfaces of the rim.

Referring now to the drawings in detail, the vehicle wheel and tire assembly of FIG. 1 shows a belted tire having a radial carcass 1, the edges of which are anchored in the beads 3 by being looped about the bead cores 2. The tire has a conventional belt 4, and mounted on a wheel 5 in such a way that the bead sealing surfaces are disposed on seating surfaces located on the radially inner side of the rim 6 next to the radially inwardly extending rim flanges 7. The rim 6 is secured to a wheel well 8. On the radially outer side, the wheel 5 is provided with a central drop base 9, and on the radially inner side, the wheel 5 is provided toward the sides with recessed mounting portions 10 that are delimited axially inwardly by the essentially perpendicular walls 11 of the rim 6. The spaces between the tire bead 3 and the walls 11 can be filled with cover rings 12 that are expediently provided with hollow spaces 13 to save weight.

The radially outwardly disposed drop base 9 is spanned by a support member 14 that is essentially embodied as a cylindrical support ring which is centrally arched or curved slightly outwardly; the support member 14 rests upon lateral portions of the rim 6. The support member 14 can be made of metal or plastic, and can be secured to the rim 6 by being glued thereto, by being press fit thereon, or any other suitable manner. Furthermore, the support member can be made of one or more pieces when viewed in the circumferential direction. If the support member 14 is made of several pieces, it is possible to introduce the one-piece wheel 5 into the interior of the tire, with the aid of the drop base 9, and only subsequently mount the support member 14. The support member has edges having a diameter that is at most equal to the diameter of the rim 6 at that location plus twice the thickness of the support member 14. If the support member 14 is in one piece, there is a maximum radial outer diameter at which it is just still possible to mount a tire. Such dimensioning can be ascertained from U.S. patent application Ser. No. 670,350 Frerichs et al filed Nov. 9, 1984 now abandoned and replaced by co-pending continuation application Ser. No. 009,592-Frerichs et al filed Jan. 29, 1987 and belonging to the assignee of the present application.

Figure 2:
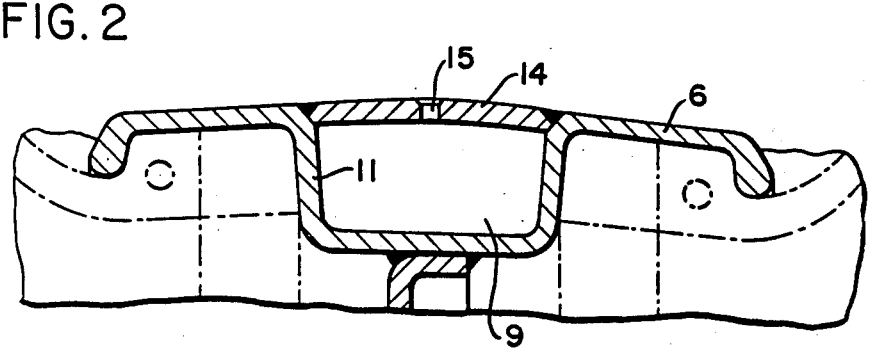
FIG. 2 is a view that shows a partial radial section through a second inventive embodiment of a wheel where the radially outer sides of the support member are flush with the lateral support surfaces of the rim, and the support member is welded to the latter.

In the embodiment of FIG. 2, the support member 14 is fixedly secured to the lateral portions of the rim 6, for example by being welded to the side walls 11 of the drop base 9. It is particularly advantageous if the diameter of the support member 14 is such that the lateral support surfaces of the rim 6 merge with the support surface of the member 14 without a step, i.e. in a flush manner, thus obtaining an optimum support surface in the event of a flat tire. Furthermore, by welding the support member 14 to the rim 6, an improved strengthening or reinforcing of the wheel 5 is achieved. Holes 15 are provided in the support member 14 to allow air to pass through.

Figure 3:
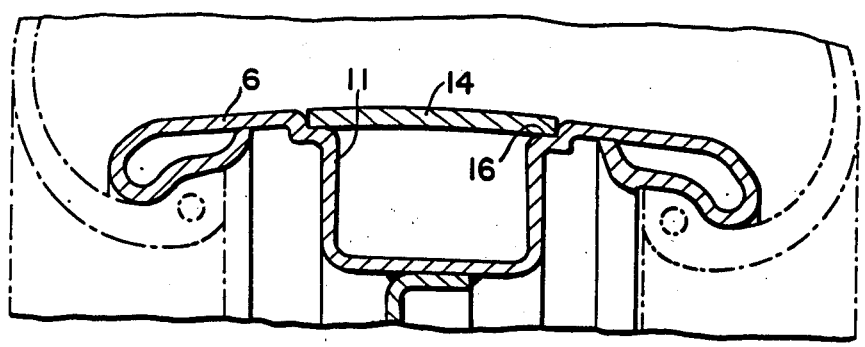
FIG. 3 is a view that shows a partial radial section through another inventive embodiment of a wheel where the radially outer edges of the drop base provide support surfaces for a support member, the radially outer side of which is again flush with the remainder the rim.

In the wheel embodiment of FIG. 3, the lateral portions of the rim 6 are recessed radially inwardly where they merge with the walls 11 of the drop base 9, resulting in support surfaces 16 or the support member 14. On the radially outer side, the support member 14 is again flush with the lateral portions of the rim 6. In the circumferential direction, the support member comprises at least two, and preferably more, parts, the edges of which abut one another.

Figure 4:
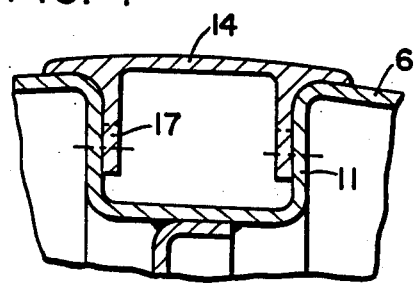
FIG. 4 is a view that shows a partial radial section through a fourth inventive embodiment of a wheel where the support member is provided with later guide elements.

FIG. 4 illustrates a portion of another wheel embodiment, again with a support member 14 that rests upon the lateral portions of the rim 6. However, in this embodiment the support member is provided with additional lateral guide elements 17 that prevent the support member 14 from shifting to the side, and which can serve for securing the support member 14 to the walls 11.

Figure 5:
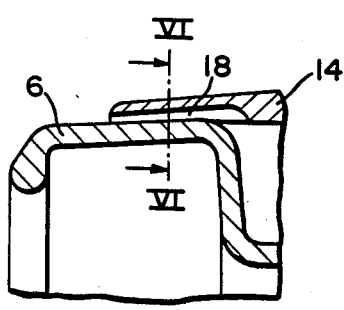
FIG. 5 is a view that shows a partial radial section part of a fifth inventive embodiment of a wheel where the support member has recessed areas for the passage of air.
Figure 6:
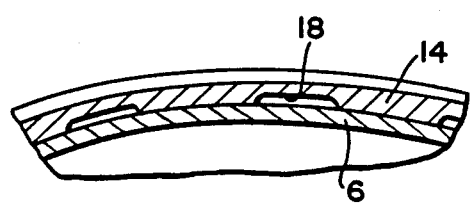
FIG. 6 is a cross-sectional view through the wheel FIG. 5 and is taken along the line VI—VI thereof.

FIG. 5 illustrates a portion of yet another inventive wheel embodiment, with a support member 14 again resting upon the lateral portions of the rim 6. In order to assure that air can pass into the interior of the tire in an unobstructed manner, the support member 14 is provided with recessed areas 18 that are spaced from one another when viewed in the circumferential direction. This is clearly shown in FIG. 6, which is a cross-sectional view through the rim 6 and the support member 14 of FIG. 5, and is taken along the line VI—VI thereof.

In the previously described embodiments, the essentially perpendicular walls 11 can also simultaneously be used as rigid abutments for cover rings 12 that in addition to their filling function also assume a wedging or holding function to prevent the two beads 3 from shifting to the side.

The present invention is, of course, in no way restricted to the specific disclosure of the specification and drawings, but also encompasses any modifications within the scope of the appended claims.

What is claimed is:

1. A vehicle wheel having a rigid unitary rim on which can be mounted a pneumatic tire; said rim having rim flanges that essentially extend radially inwardly; said wheel also having a drop base that is centrally disposed relative to said rim and that includes side walls which have recesses at radially outer location to form support surfaces therewith, said drop base being open radially outwardly; disposed on the radially inner side of said rim, between said drop base and each of said rim flanges, are respective recessed mounting portions for receiving the beads of a tire; said wheel further comprises the improvement in combination therewith including:

means for enlargement of supporting surfaces achieved while maintaining rigidity characteristics of a wheel having a drop base and including an annular support member for spanning said drop base of said wheel between radially outer location of the side walls, with said support member being in the form of an annular ring that is outwardly arched in cross-section to a predetermined extent for also increasing the diameter of support surfaces thus resulting in greater operating efficiencies when a flat tire is encountered, said support member being supported between said walls in said drop base on the recesses such that the radially outer side of said support member is flush with the radially outer side of said rim to form a common support surface therewith.

2. A wheel in combination according to claim 1, in which said support member has edges having an outside diameter that is limited to be equal to the diameter of said rim at that location plus twice the thickness of said support member.

3. A wheel in combination according to claim 1, in which said support member is in one piece.

4. A wheel in combination according to claim 1, in which said support member is made of a material selected from the group consisting of metal and plastic.

5. A wheel in combination according to claim 1, in which said support member is provided with recessed areas for the passage of air

* * * * *